(12) United States Patent
Kelsey

(10) Patent No.: US 6,753,625 B2
(45) Date of Patent: Jun. 22, 2004

(54) METHOD AND APPARATUS FOR IMPLEMENTING PROGRAMMABLE BATTERY SHUT OFF

(75) Inventor: Todd Mark Kelsey, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 10/109,444

(22) Filed: Mar. 28, 2002

(65) Prior Publication Data

US 2003/0184162 A1 Oct. 2, 2003

(51) Int. Cl.$^7$ .............................................. H01H 47/00
(52) U.S. Cl. ..................................... 307/150; 320/132
(58) Field of Search .......................... 307/10.7, 46, 140, 307/150; 320/132

(56) References Cited

U.S. PATENT DOCUMENTS

| | | | |
|---|---|---|---|
| 5,204,991 A | * 4/1993 | Law | 307/10.7 |
| 5,268,845 A | 12/1993 | Startup et al. | |
| 5,272,386 A | 12/1993 | Kephart | |
| 5,349,668 A | 9/1994 | Gladstein et al. | |
| 5,459,671 A | * 10/1995 | Duley | 702/63 |
| 5,773,961 A | 6/1998 | Cameron et al. | |
| 5,920,726 A | 7/1999 | Anderson | |
| 5,945,806 A | * 8/1999 | Faulk | 320/127 |
| 6,072,784 A | 6/2000 | Agrawal et al. | |
| 6,194,870 B1 | * 2/2001 | Kim | 320/134 |
| 6,268,711 B1 | 7/2001 | Bearfield | |
| 6,335,855 B1 | * 1/2002 | Alexanian et al. | 361/179 |
| 6,459,173 B1 | * 10/2002 | Gunsaulus et al. | 307/66 |
| 6,459,175 B1 | * 10/2002 | Potega | 307/149 |

FOREIGN PATENT DOCUMENTS

WO    WO 8906477 A1    7/1989

OTHER PUBLICATIONS

IBM Technical Disclosure Bulletin, "System Shutdown Circuit" v38 pp. 583–584, Mar. 1995.

* cited by examiner

*Primary Examiner*—Adolf Berhane
(74) *Attorney, Agent, or Firm*—Joan Pennington (57) ABSTRACT

A method, apparatus and computer program product are provided for implementing programmable battery shut in an electronic device system. A device battery consumption configuration file is stored. The device battery consumption configuration file includes at least one configuration threshold parameter. Electronic device system operation is monitored to identify the configuration threshold parameter being met. Responsive to identifying the configuration threshold parameter being met, the electronic device system is powered off. The device battery consumption configuration file includes the configuration threshold parameter that is user defined, such as, a user selected battery time left value or a user selected battery usage percent value, for implementing programmable battery shut. At least one battery specific hardware input button is provided for user operation to allow quick external battery management. Each input button is programmed via a battery management program for a specific external battery management function. During operation of the electronic device system, each time the user depresses the input button the threshold parameter is changed by a set value.

22 Claims, 7 Drawing Sheets

DEVICE BATTERY CONSUMPTION CONFIGURATION FILE 400

| |
|---|
| BATTERY CONFIG ACTIVE FLAG 402 |
| POWER ON OR POWER OFF FLAG 404 |
| BATTERY % 406 |
| BATTERY TIME (MINS) 408 |
| ALARM INDICATOR FLAG FOR ACTION 410 |
| ALARM INDICATOR (I.E. FLASH, AUDIBLE, VIBRATE,...) 412 |
| ALARM INDICATOR DATA (I.E. E-MAIL ADDRESS, PAGER PHONE NUMBER,...) 414 |
| BUTTON A ON/OFF INDICATOR & BUTTON PRESS TIME OR BATTERY % DATA 416 |
| BUTTON B ON/OFF INDICATOR & BUTTON PRESS TIME OR BATTERY % DATA 418 |

METHOD AND APPARATUS FOR IMPLEMENTING PROGRAMMABLE BATTERY SHUT OFF

FIELD OF THE INVENTION

The present invention relates generally to the data processing field, and more particularly, relates to a method, apparatus and computer program product for implementing programmable battery shut off.

DESCRIPTION OF THE RELATED ART

Batteries power many electronic devices. The shift to mobile computing has also increased the reliance and importance of batteries to power a growing number of devices. For example, batteries are used to power lap top computers, Personal Data Assistant (PDAs), Global Positioning Systems (GPSs), cell phones, MP3 players, radios, and the like. These devices are becoming critical to people. Also it is critical to generally have available battery energy to operate these devices.

Today, various approaches are used to conserve battery life in these devices. For example, some lap top computers, when not used for a period of time, will shut off the display, disk drive, and the like. Some devices also shut themselves totally off after not being used for a defined period of time, for example, if PDA input is not received for 5 minutes, the PDA shuts itself off. Other devices, for example, such as cell phones in a stand by mode continue operating until batteries are exhausted then the cell phones turn themselves off.

One existing problem with this approach is that even though energy consumption is reduced, drainage still occurs with many devices until the device completely drains the battery and then stops hard or in more advanced systems turn itself off with the last available energy, for example, the cell phone. This can happen even if the system is not being actively used but the user forgets the system is on and upon the user's eventual return the system is no longer usable. The result is a dead system that cannot be used until an AC adapter or new battery is installed. However, an immediate source of energy is not always available.

A need exists for a battery management program having the ability to implement programmable battery shut off. A need exists for a method by which a battery management program can be configured to accomplish this task.

SUMMARY OF THE INVENTION

A principal object of the present invention is to provide a method, apparatus and computer program product for programmable battery shut off. Other important objects of the present invention are to provide such method, apparatus and computer program product for programmable battery shut off substantially without negative effect and that overcome many of the disadvantages of prior art arrangements.

In brief, a method, apparatus and computer program product are provided for implementing programmable battery shut in an electronic device system. A device battery consumption configuration file is stored. The device battery consumption configuration file includes at least one configuration threshold parameter. Electronic device system operation is monitored to identify the at least one configuration threshold parameter being met. Responsive to identifying the at least one configuration threshold parameter being met, the electronic device system is powered off.

In accordance with features of the invention, the device battery consumption configuration file includes the configuration threshold parameter that is user defined, such as a user selected battery time left value or a user selected battery usage percent value, for implementing programmable battery shut. At least one battery specific hardware input button is provided for user operation to allow quick external battery management. Each input button is programmed via a battery management program for specific external battery management functions. Each time the user depresses the input button the threshold parameter optionally is changed by a set value.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
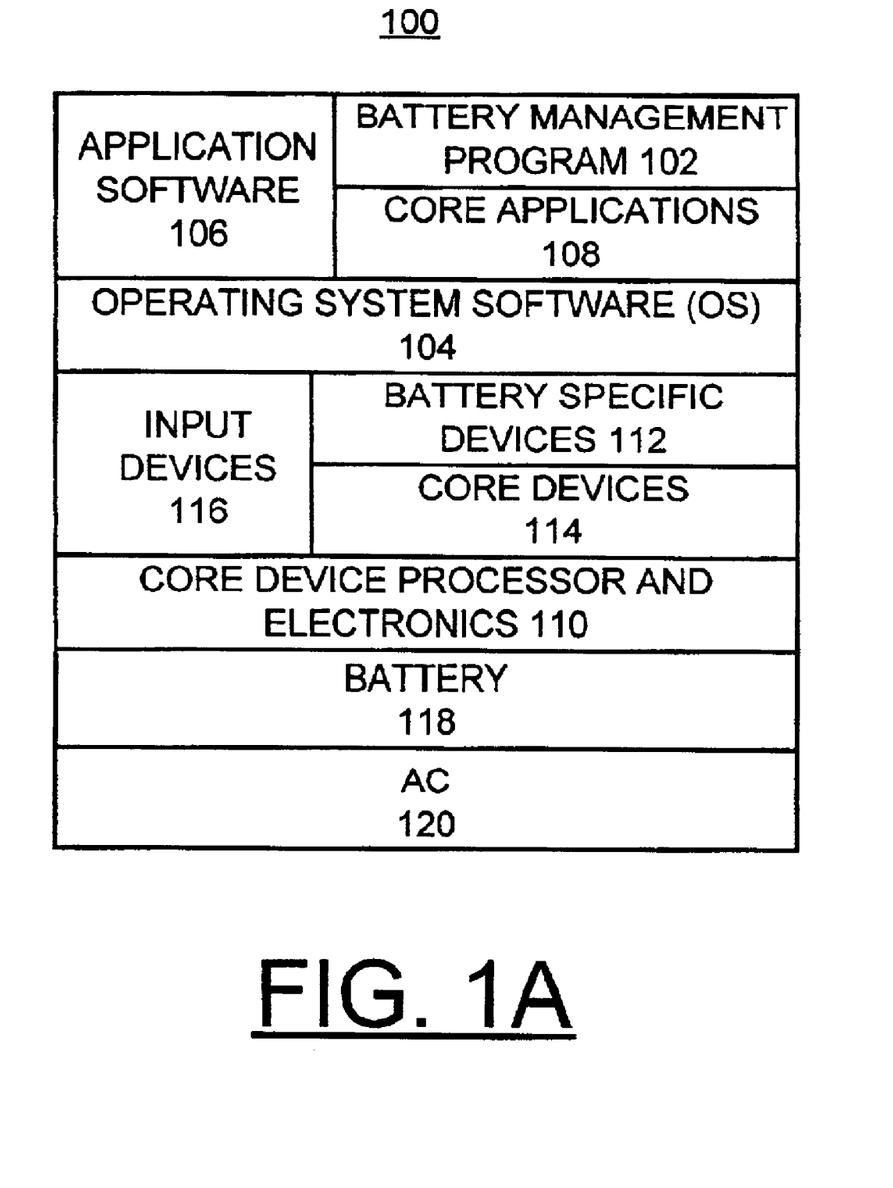
FIGS. 1A and 1B are block diagram representations illustrating an exemplary electronic device system and battery specific hardware input system for implementing programmable battery shut off in accordance with the preferred embodiment.
Figure 1B:
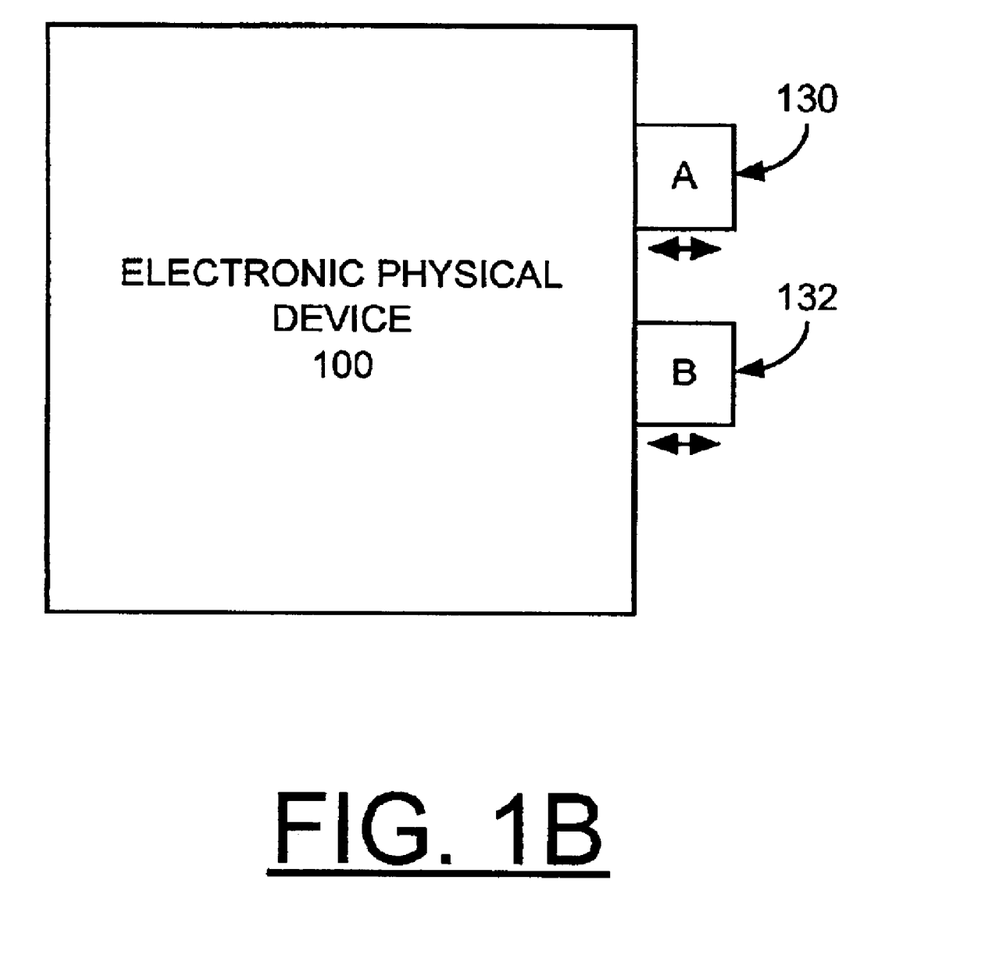

Having reference now to the drawings, in FIGS. 1A and 1B, there is shown an exemplary electronic device system including battery specific hardware input generally designated by the reference character 100 for implementing programmable battery shut off in accordance with the preferred embodiment. Electronic device system 100 includes a battery management program 102 in accordance with the preferred embodiment. Electronic device system 100 includes an operating system 104, application software 106 and core applications 108. Electronic device system 100 includes core device processor and electronics 110, battery specific devices 112, core devices 114, and input devices 116. Electronic device system 100 includes a battery 118 and an AC power 120. It should be understood that the battery management program 102 in accordance with the preferred embodiment optionally can be implemented integrally with the operating system 104.

In accordance with features of the preferred embodiment, various devices can be implemented by electronic device system 100. For example, any of various battery powered devices, such as lap top computers, Personal Data Assistant (PDAs), Global Positioning Systems (GPSs), cell phones, MP3 players, radios, and the like, advantageously can be implemented by electronic device system 100.

In accordance with features of the preferred embodiment, battery management program 102 implements a programmable interface that allows a specific battery threshold, for example, a percent left, a time left, and the like, to be defined so that the electronic device system 100 automatically turns itself off. For example, using the electronic device system 100 to implement a cell phone, the cell phone system 100 of the preferred embodiment is programmed to turn itself off when a specific user defined threshold is reached. For example, the user could define the shut off point to be 10% of the battery energy left. This threshold optionally is defined to have specific cases where the rule is temporarily ignored, for example, a cell phone would not be turned off during a call but, when the call is ended and it returns to stand by mode. The benefit is that the device would still be usable when powered back on in this case 10% of the battery energy would be left for important or emergency usage. This invention solves the problem of having dead devices that run out of battery power unbeknownst to the user. Instead, the electronic device system 100 powers itself off while still having usable battery energy left to perform for a user defined period of time or percentage battery left, for example, enabling available battery power for a cell phone to still make an emergency call.

Referring to FIG. 1B, there are shown a pair of battery specific hardware input buttons A and B, 130, 132 for user operation to allow quick external battery management. Input buttons A and B, 130, 132 are programmed via the battery management program 102 for specific external battery management functions. For example, button A, 130 can be configured by the battery management program 102 to increase a battery control timer by 5 minutes each time the user depresses button A. Then pressing button A, 130 six times keeps the device system 100 active for an additional 30 minutes before normal threshold shut off of battery 118 is provided to power off the electronic device system 100. Button B, 132 can be configured, for example, to provide a reverse function by the battery management program 102. For example, button B can be configured to keep the electronic device system 100 inactive for a selected time period. Then pressing button B, 132 sets another battery control timer each time the user depresses button B to keep the electronic device system 100 powered off, such as for 2 hours while the user views a movie, then to power the electronic device system 100 back on.

Figure 2:
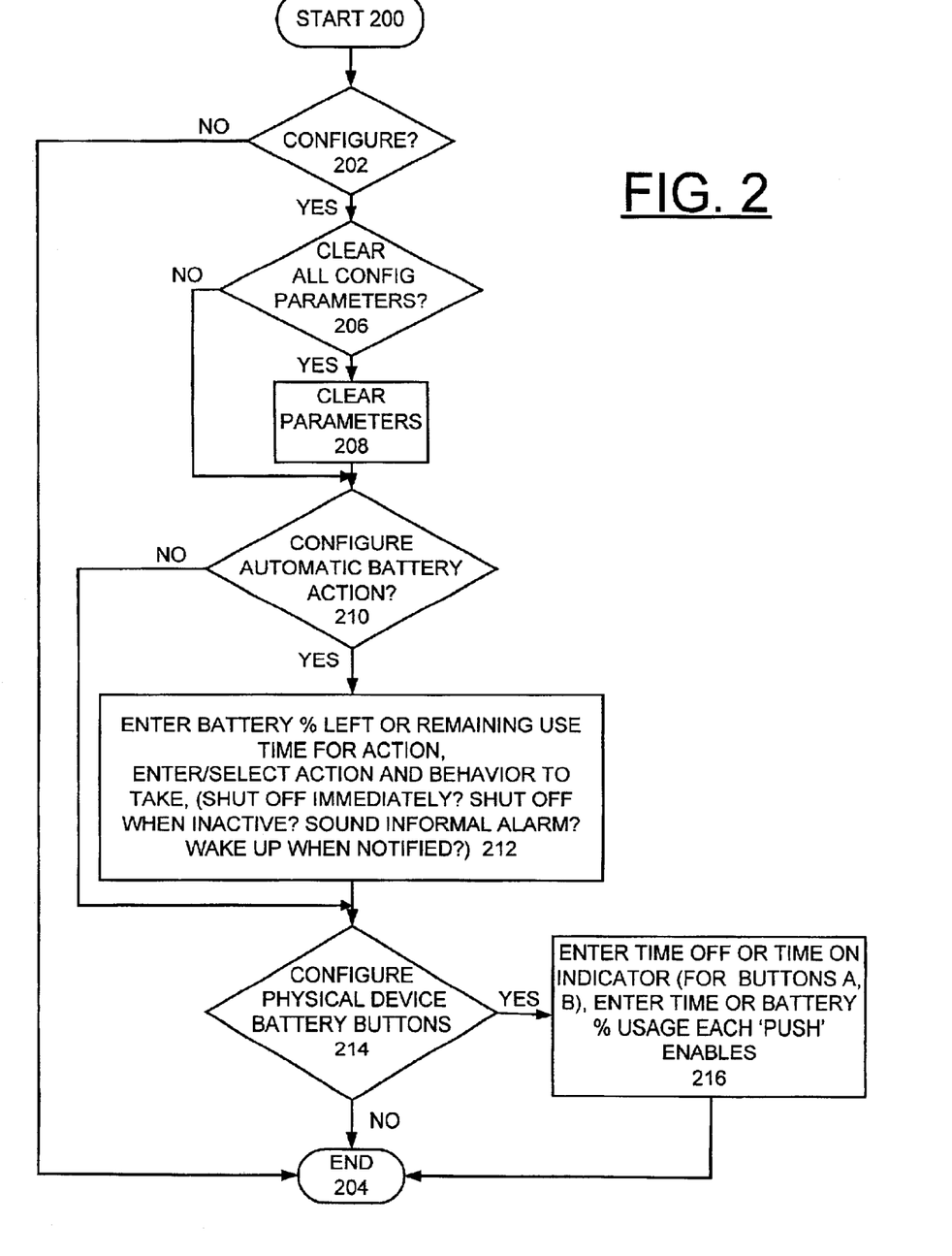
FIGS. 2, 3A and 3B are flow charts illustrating exemplary steps for implementing programmable battery shut off in accordance with the preferred embodiment.

Referring now to FIG. 2, there are shown exemplary steps for implementing device battery consumption configuration for programmable battery shutoff in accordance with features of the preferred embodiment starting at block 200. Checking for a configure selection is performed as indicated in a decision block 202. When the configure selection is not identified, then the sequential step end as indicated in a block 204. When the configure selection is identified, then checking for a clear all configuration parameters option is performed as indicated in a decision block 206. When the clear all configuration parameters is identified, then the configuration parameters are cleared as indicated in a block 208. Then checking for a configure automatic battery action is performed as indicated in a decision block 210. When the configure automatic battery action is identified, prompts are displayed for user entries of battery percent left or remaining use time action; and of action and behavior to take at the selected battery percent left or remaining use time action, such as shut off immediately, shut off when inactive, sound informal alarm, and wake up when notified, as indicated in a block 212. When the configure automatic battery action is not identified or after the user entries to configure automatic battery action are received at block 212, checking for a configure device battery buttons option is performed as indicated in a decision block 214. When the configure device battery buttons option is identified, then the user is prompted to enter a time off or time on for the buttons A, B, 130 and 132, and a time or battery percentage usage each button press enables as indicated in a block 216. Then the sequential operations end at block 204.

Figure 3A:
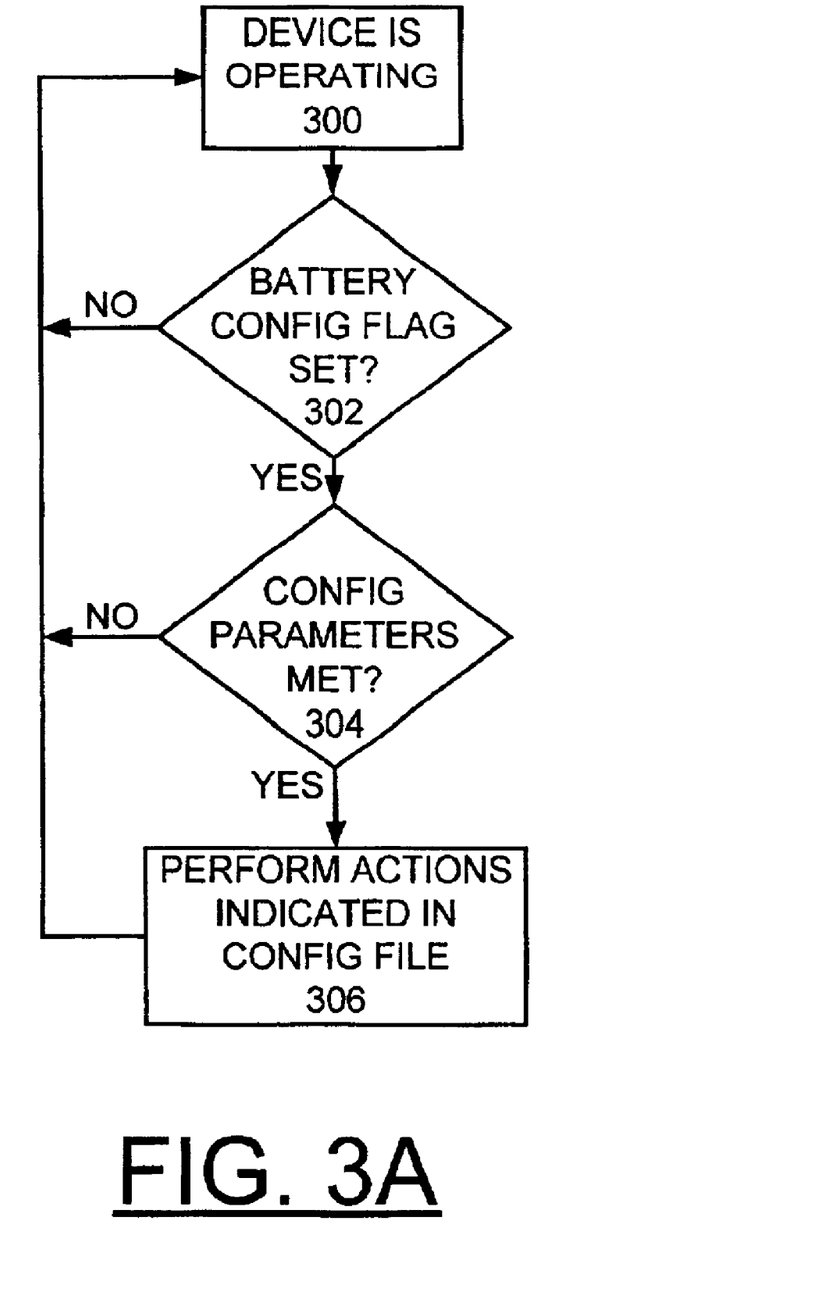

Referring now to FIG. 3A, there are shown exemplary steps for monitoring of battery consumption configuration for implementing programmable battery shutoff in accordance with features of the preferred embodiment starting at block 300 when the device is operating. Checking whether the battery configuration flag is set is performed as indicated in a decision block 302. When the battery configuration flag is not set, then the sequential steps return to block 300. When the battery configuration flag is set, then checking whether any configuration parameters are met as indicated in a decision block 304. When configuration parameters are met, then actions indicated in the configuration file are performed as indicated in a block 306. An exemplary device battery consumption configuration file in accordance with the preferred embodiment is illustrated and described with respect to FIG. 4.

Figure 3B:
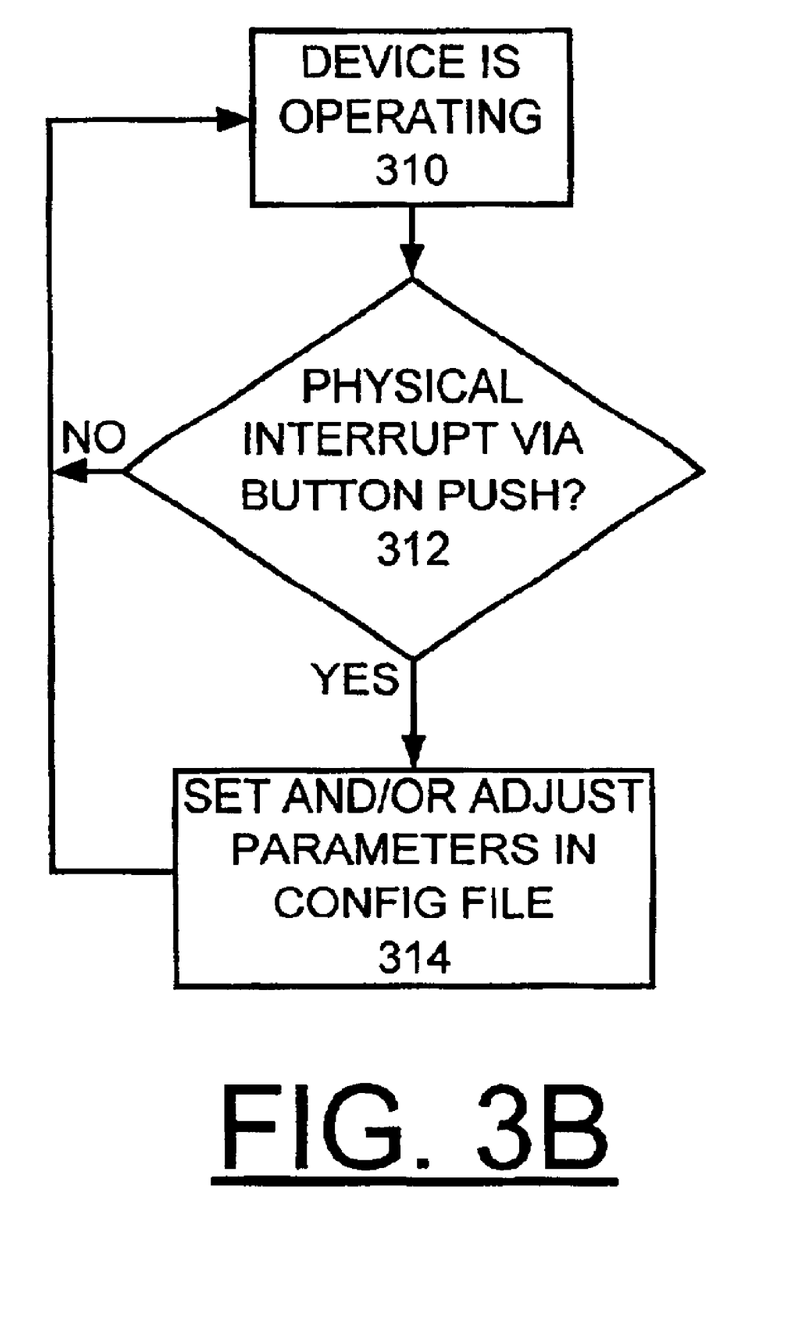

Referring now to FIG. 3B, there are shown exemplary steps for monitoring of user entered physical button intervention for implementing programmable battery shutoff in accordance with features of the preferred embodiment starting at block 310 when the device is operating. Checking for a physical interrupt via a button push is performed as indicated in a decision block 312. When the physical interrupt via a button push is not identified, then the sequential steps return to block 310. When the physical interrupt via a button push is identified, then corresponding configuration parameters are set and/or adjusted in the configuration file as indicated in a block 314.

Figure 4:
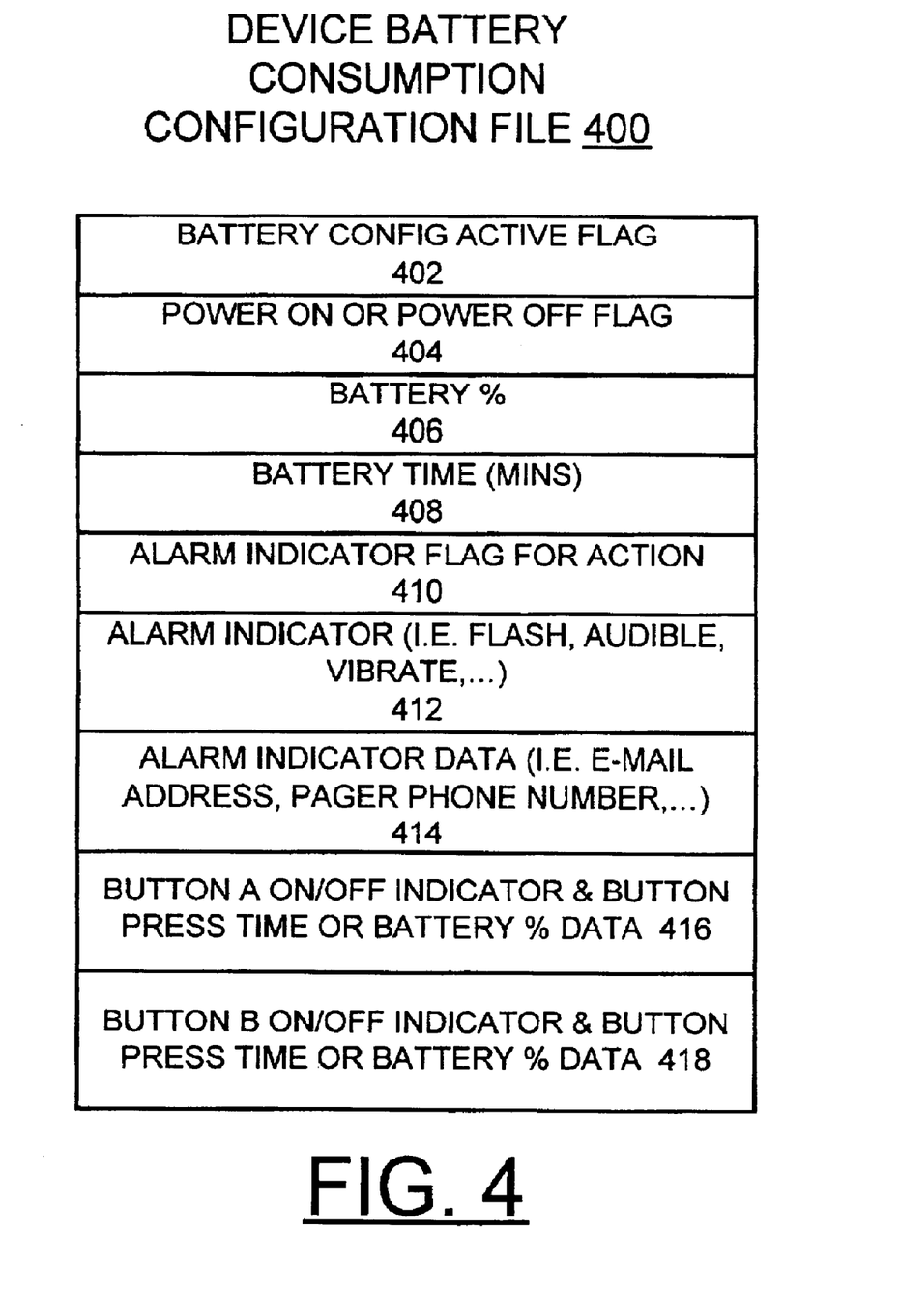
FIG. 4 is a block diagram illustrating an exemplary device battery consumption configuration file in accordance with the preferred embodiment.

Referring now to FIG. 4, there is shown an exemplary device battery consumption configuration file in accordance with the preferred embodiment generally designated by the reference character 400. Device battery consumption configuration file 400 includes a battery configuration active flag 402 identified at block 302 in FIG. 3A, a power on or power off flag 404, a user selected battery percent left 406, a user selected battery time left 408, an alarm indicator flag 410 for action, an alarm indicator 412, for example, flash, audible, vibrate, and alarm indicator data 414, for example, e-mail address, pager phone number, and the like. The alarm indicator data 414 is used in conjunction with the alarm indicator 412 to notify the user via an e-mail or pager notice of the battery shut off. Device battery consumption configuration file 400 includes user selected configuration data 416 and 418 for defining functions of buttons A and B, 130, 132.

Figure 5:
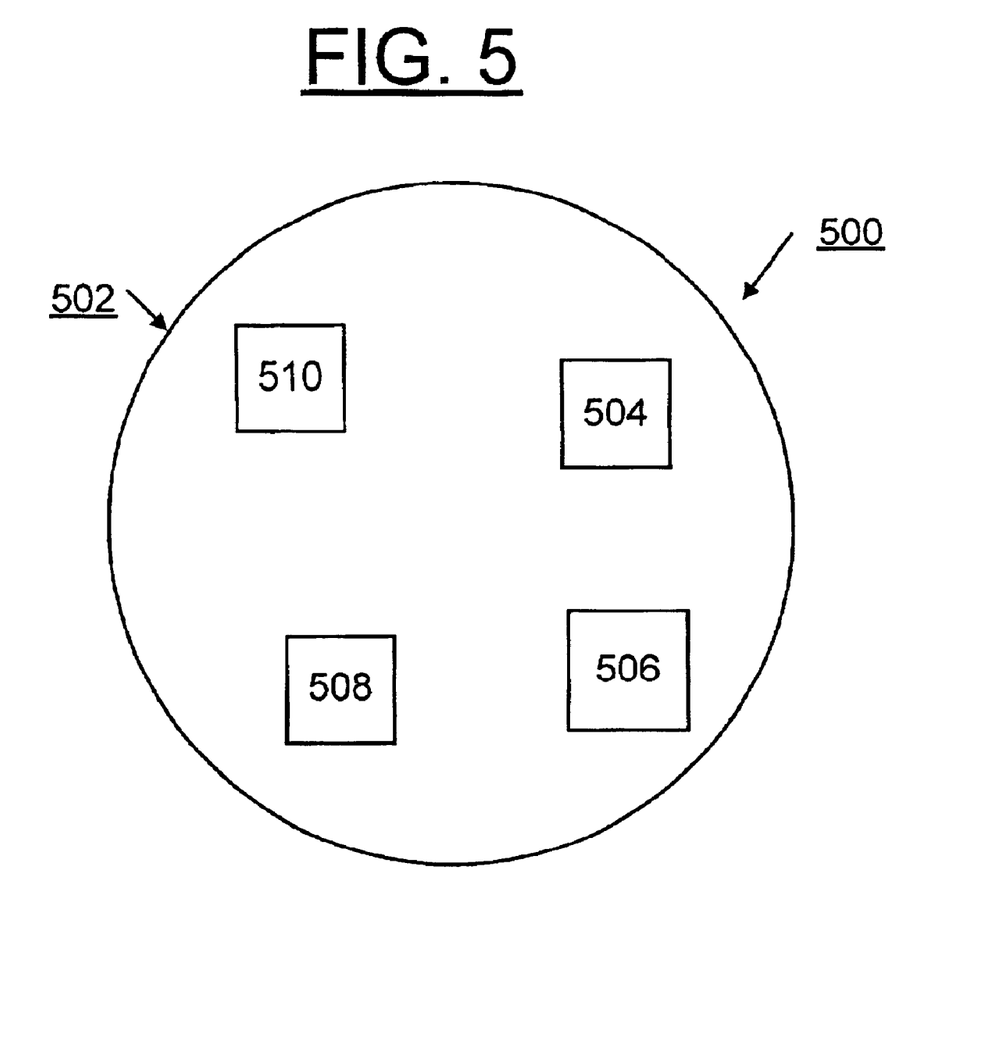
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 504, 506, 508, 510 on the medium 502 for carrying out the methods for implementing programmable battery shut off of the preferred embodiment in the electronic device system 100 of FIGS. 1A and 1B.

A sequence of program instructions or a logical assembly of one or more interrelated modules defined by the recorded program means 504, 506, 508, 510, direct the electronic device system 100 for implementing programmable battery shut off of the preferred embodiment.

While the present invention has been described with reference to the details of the embodiments of the invention shown in the drawing, these details are not intended to limit the scope of the invention as claimed in the appended claims.

What is claimed is:

1. A method for implementing programmable battery shut off in an electronic device system; said method comprising the steps of:

storing a device battery consumption configuration file; said device battery consumption configuration file including at least one configuration threshold parameter;

monitoring electronic device system operation to identify said at least one configuration threshold parameter being met; and responsive to identifying said at least one configuration threshold parameter being met, powering off the electronic device system.

2. A method for implementing programmable battery shut off in an electronic device system as recited in claim 1 wherein the step of storing said device battery consumption configuration file includes the step of storing a user selected battery usage percent value; said user selected battery usage percent value defining said configuration threshold parameter.

3. A method for implementing programmable battery shut off in an electronic device system as recited in claim 1 wherein the step of storing said device battery consumption configuration file includes the step of storing a user entered battery time left value; said user entered battery time left value defining said configuration threshold parameter.

4. A method for implementing programmable battery shut off in an electronic device system as recited in claim 1 wherein the step of storing said device battery consumption configuration file includes the step of storing a user selected alarm action; and further includes the step of providing an alarm indicator responsive to identifying said at least one configuration threshold parameter being met, said alarm indicator including at least one of an e-mail notice, a pager notice, an audible notice, a visual notice and a vibration notice.

5. A method for implementing programmable battery shut off in an electronic device system as recited in claim 1 wherein the step of storing said device battery consumption configuration file includes the step of storing a user selected configuration for a battery specific hardware input button.

6. A method for implementing programmable battery shut off in an electronic device system as recited in claim 5 wherein the step of storing said user selected configuration for said battery specific hardware input button includes the step of storing a user selected on function or user selected off function for said battery specific hardware input button.

7. A method for implementing programmable battery shut off in an electronic device system as recited in claim 6 wherein the step of storing said user selected configuration for said battery specific hardware input button includes the step of storing a user selected time value or a battery percent usage defined for a button push of said battery specific hardware input button.

8. A method for implementing programmable battery shut off in an electronic device system as recited in claim 1 further includes the step of monitoring electronic device system operation to identify a button push of a battery specific hardware input button.

9. A method for implementing programmable battery shut off in an electronic device system as recited in claim 8 further includes the step of adjusting said stored device battery consumption configuration file responsive to identifying said button push.

10. A method for implementing programmable battery shut off in an electronic device system as recited in claim 9 wherein the step of adjusting said stored device battery consumption configuration file responsive to identifying said button push includes the step of changing said at least one configuration threshold parameter responsive to identifying said button push.

11. A method for implementing programmable battery shut off in an electronic device system as recited in claim 9 wherein the step of adjusting said stored device battery consumption configuration file responsive to identifying said button push includes the step of powering off the electronic device system for a defined time period responsive to identifying said button push.

12. A battery management program product for implementing programmable battery shut off in an electronic device system comprising:

a recording medium;

means, recorded on the recording medium, for storing a device battery consumption configuration file; said device battery consumption configuration file including at least one configuration threshold parameter;

means, recorded on the recording medium, for monitoring electronic device system operation to identify said at least one configuration threshold parameter being met; and means, recorded on the recording medium, responsive to identifying said at least one configuration threshold parameter being met, for powering off the electronic device system.

13. A battery management program product for implementing programmable battery shut off in an electronic device system as recited in claim 12 further includes means, recorded on the recording medium, for receiving user selections for storing said device battery consumption configuration file.

14. A battery management program product for implementing programmable battery shut off in an electronic device system as recited in claim 12 further includes means, recorded on the recording medium, for monitoring electronic device system operation to identify a button push of a battery specific hardware input button and for changing said stored device battery consumption configuration file responsive to identifying said button push.

15. A battery management program product for implementing programmable battery shut off in an electronic device system as recited in claim 12 further includes means, recorded on the recording medium, for identifying a button push of a battery specific hardware input button and for changing said at least one configuration threshold parameter responsive to identifying said button push.

16. A battery management program product for implementing programmable battery shut off in an electronic device system as recited in claim 12 further includes means, recorded on the recording medium, for providing an alarm indicator responsive to identifying said at least one configuration threshold parameter being met, said alarm indicator including at least one of an e-mail notice, a pager notice, an audible notice, a visual notice and a vibration notice.

17. An electronic device system for implementing programmable battery shut off comprising:

a battery management program product; said battery management program product including a plurality of computer executable instructions stored on a computer readable medium, wherein said instructions, when executed by said electronic device system, cause the electronic device system to perform the steps of:

receiving user selections for storing a device battery consumption configuration file; said device battery consumption configuration file including a user defined threshold parameter;

monitoring electronic device system operation to identify said user defined threshold parameter being met; and responsive to identifying said user defined threshold parameter being met, powering off the electronic device system.

18. An electronic device system for implementing programmable battery shut off as recited in claim 17 wherein said instructions, when executed by said electronic device system, further cause the electronic device system to perform the steps of providing an alarm indicator responsive to identifying said at least one configuration threshold parameter being met, said alarm indicator including at least one of an e-mail notice, a pager notice, an audible notice, a visual notice and a vibration notice.

19. An electronic device system for implementing programmable battery shut off as recited in claim 17 wherein said instructions, when executed by said electronic device system, further cause the electronic device system to perform the steps of monitoring electronic device system operation to identify a button push of a battery specific hardware input button.

20. An electronic device system for implementing programmable battery shut off as recited in claim 19 wherein said instructions, when executed by said electronic device system, further cause the electronic device system to perform the steps of changing said stored device battery consumption configuration file responsive to identifying said button push.

21. An electronic device system for implementing programmable battery shut off as recited in claim 17 wherein the step of receiving user selections for storing said device battery consumption configuration file includes the step of storing a user selected configuration for a battery specific hardware input button.

22. An electronic device system for implementing programmable battery shut off as recited in claim 21 wherein the step of storing said user selected configuration for a battery specific hardware input button includes the step of storing a user selected time value or a battery percent usage defined for each button push of said battery specific hardware input button.

* * * * *